(12) United States Patent
Lai

(10) Patent No.: US 7,583,496 B2
(45) Date of Patent: Sep. 1, 2009

(54) PORTABLE ELECTRONIC DEVICE

(75) Inventor: Chin-Chung Lai, Taipei (TW)

(73) Assignee: ASUSTeK Computer Inc., Taipei (TW)

( * ) Notice: Subject to any disclaimer, the term of this patent is extended or adjusted under 35 U.S.C. 154(b) by 0 days.

(21) Appl. No.: 12/112,654

(22) Filed: Apr. 30, 2008

(65) Prior Publication Data
US 2008/0297995 A1 Dec. 4, 2008

(30) Foreign Application Priority Data
Jun. 1, 2007 (TW) .............. 96119870 A (51) Int. Cl.
H05K 5/00 (2006.01)
H05K 7/00 (2006.01)
H04M 1/00 (2006.01)

(52) U.S. Cl. ............ 361/679.3; 455/575.4; 361/679.27; 361/679.56

(58) Field of Classification Search ............ 361/679.09, 361/679.26, 679.27, 679.3, 679.56; 455/575.4
See application file for complete search history.

(56) References Cited

U.S. PATENT DOCUMENTS
2007/0105606 A1* 5/2007 Yoon et al. ................ 455/575.4
2008/0081505 A1* 4/2008 Ou et al. ..................... 439/374
2008/0174942 A1* 7/2008 Yang et al. .................. 361/680

* cited by examiner

*Primary Examiner*—Jayprakash N Gandhi
*Assistant Examiner*—Anthony M Haughton
(74) *Attorney, Agent, or Firm*—Muncy, Geissler, Olds, & Lowe, PLLC (57) ABSTRACT

A portable electronic device includes a first body, a second body, a guiding assembly, a first elastic element and a connecting part. The first body has a track portion and a protrudent block, and the second body has a fastening part. The guiding assembly has a sliding rod and a guiding part. The two ends of the sliding rod are fixed at the first body, and the sliding rod passes through the guiding part. The first elastic element connects to the first body and the second body. The connecting part is fixed at the second body. The sliding portion is slidingly disposed at the track portion, and the pivot passes through the guiding part. As a result, not only the first body slide relatively to the second body, but also an angle is formed between the first body and the second body.

16 Claims, 8 Drawing Sheets

PORTABLE ELECTRONIC DEVICE

CROSS REFERENCE TO RELATED APPLICATIONS

This Non-provisional application claims priority under 35 U.S.C. §119(a) on Patent Application No(s). 096119870 filed in Taiwan, Republic of China on Jun. 1, 2007, the entire contents of which are hereby incorporated by reference.

BACKGROUND OF THE INVENTION

1. Field of Invention

The invention relates to an electronic device and, more particularly, to a portable electronic device.

2. Related Art

The portable electronic device has not only advantages such as lightness, slimness, shortness, smallness and convenience in carrying, it also has a special man-machine interface (such as touch input interface) and functions such as wireless communication function (such as audio and data transfer function) and human intelligence function (such as word and audio recognition function). Therefore, the portable electronic device is widely used in various fields.

The ultra mobile personal computer (UMPC), the translator, the personal digital assistant (PDA), the notebook computer, the audio and video player or handheld game player is the common portable electronic device. Taking the UMPC as an example, an UMPC has functions such as making or answering a phone call, accessing Internet, wirelessly transmitting, taking a picture, using GPS positioning device, compiling and programming and playing music and game.

Figure 1A:
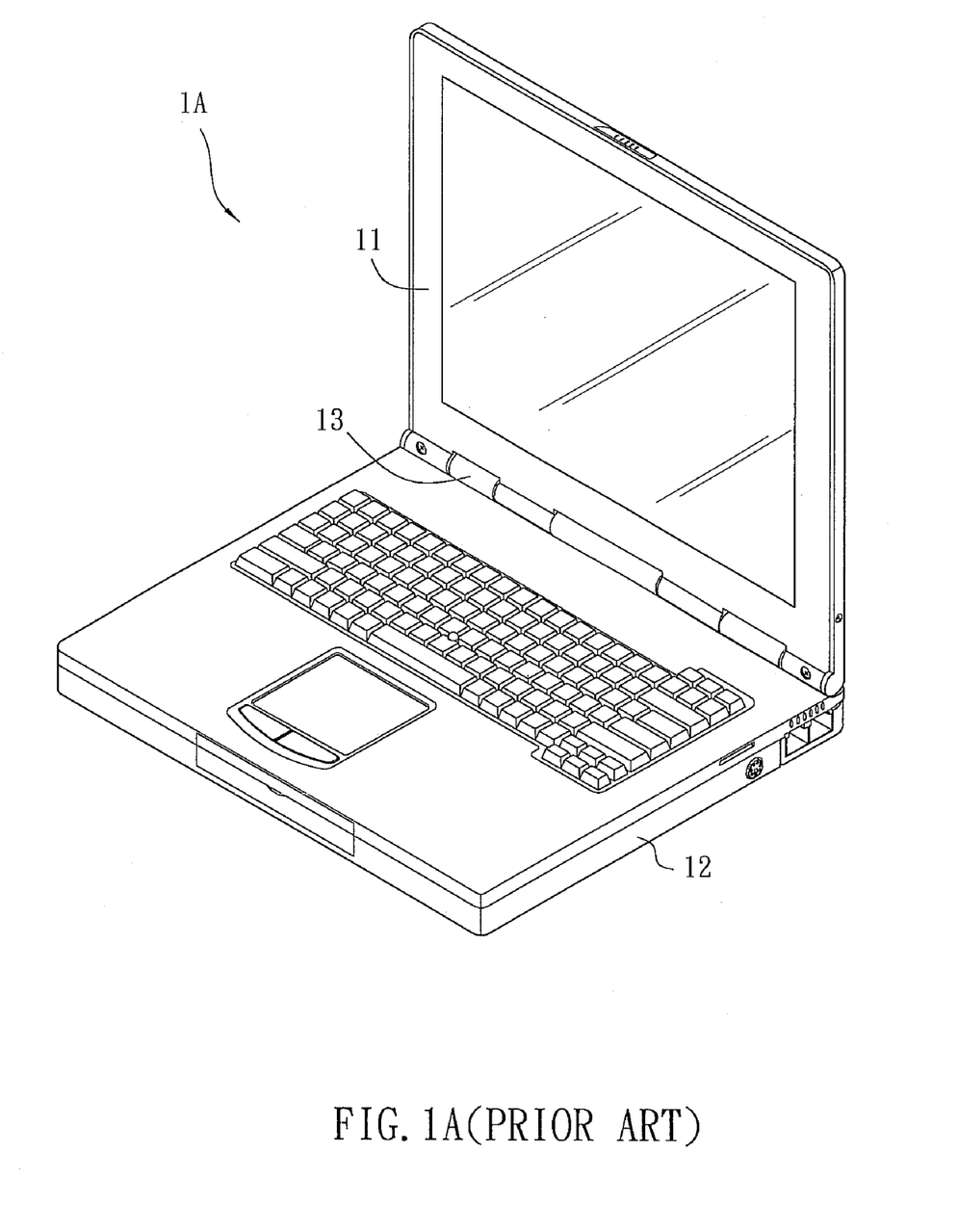
FIG. 1A is a structural schematic diagram showing a conventional flip type electronic device.
Figure 1B:
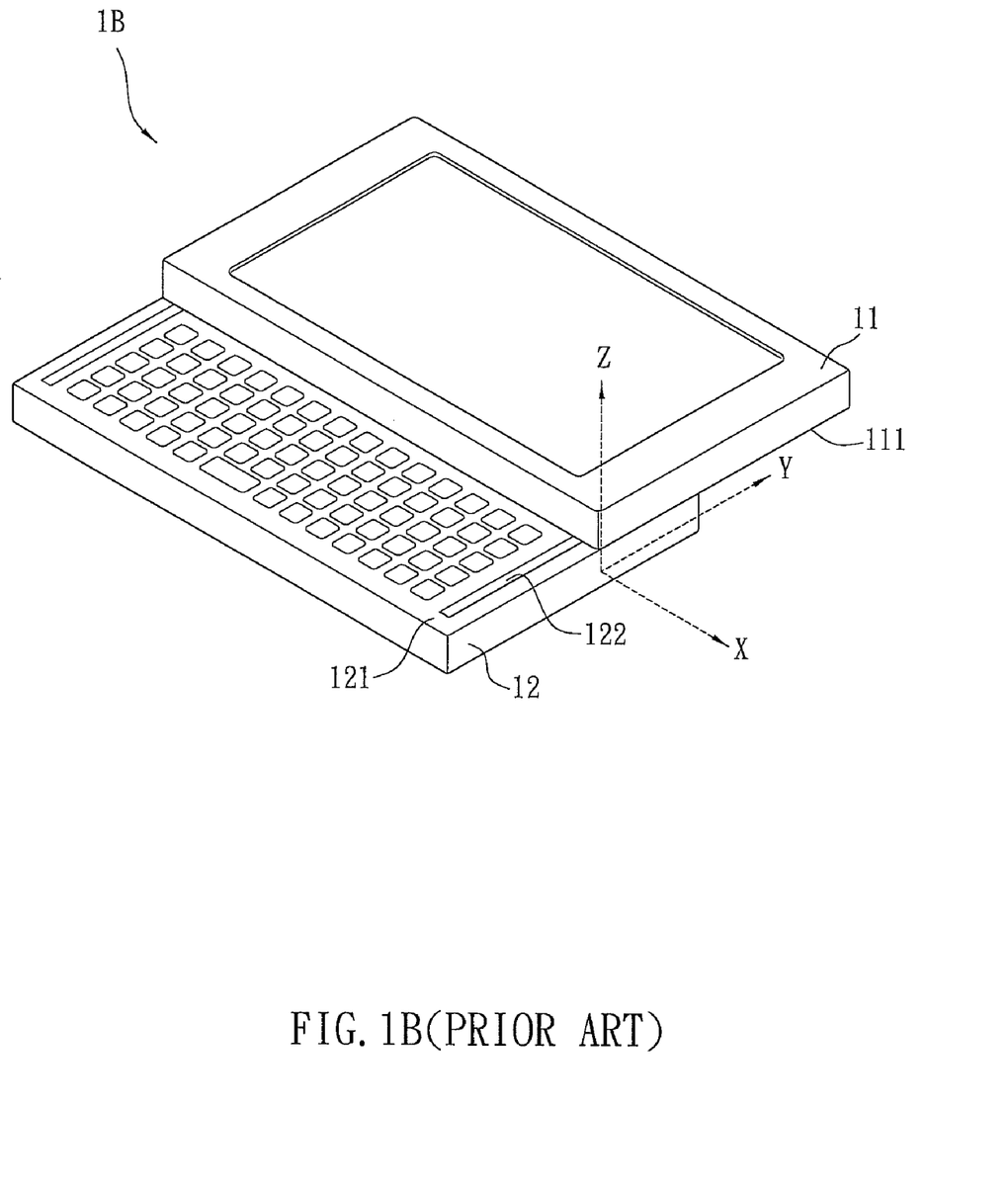
FIG. 1B is a structural schematic diagram showing a conventional sliding type electronic device.

FIG. 1A is a structural schematic diagram showing a conventional flip type electronic device 1A, and FIG. 1B is a structural schematic diagram showing a conventional sliding type electronic device 1B. The flip type electronic device 1A is, for example, a notebook. The sliding electronic device 1B is, for example, an UMPC. Both of the flip type electronic device 1A and the sliding electronic device 1B have a first body 11 and a second body 12, and the first body 11 is adjacently provided at the second body 12.

In FIG. 1A, the flip type electronic device 1A further has a pivot 13, and the first body 11 and the second body 12 are pivotally connected to the pivot 13. The first body 11 rotates relatively to the second body 12 with the pivot 13 as the axis. In FIG. 1B, each of two sides of a surface 121 of the second body 12 has a groove 122 along the direction of the Y axis. A surface 111 of the first body 11 has a protrudent block whose position is corresponding to the position of each groove 122. Thus, the first body 11 may be slidingly provided at the second body 12. Herein, the second body 12 may be a keyboard module and a control module, and the first body 11 may be a display panel or a touch pad. The second body 12 is used to the control the operation of the first body 11.

However, in the flip type electronic device 1A, the pivot 13 is easily destroyed because of overuse, and a rotating room should be prepared to allow the first body 11 to rotate relatively to the second body 12 in the flipping process. The sliding type electronic device 1B does not have above defects. However, the first body 11 and the second body 12 of the sliding-type electronic device 1B are parallel, and then users may feel uncomfortable after using for a long time. The above design does not accord with ergonomics.

SUMMARY OF THE INVENTION

One objective of the invention is to provide a portable electronic device which is operated conveniently, does not occupy large room and accords with the ergonomics.

To achieve the above objective, the invention provides a portable electronic device including a first body, a second body, a guiding assembly, a first elastic element and a connecting part. The first body has a track portion and a protrudent block. The second body has a fastening part. The guiding assembly has a sliding rod, a guiding part and a first elastic element. The connecting part has a sliding portion and a pivot. The two ends of the sliding rod are fixed at the first body, respectively, and the sliding rod passes through the guiding part to allow the guiding part to slide along the sliding rod. The first elastic element is connected to the first body and the second body. The connecting part is fixed at the second body. The sliding portion is slidingly disposed at the track portion, and the pivot passes through the guiding part. The first body slides relatively to the second body to allow the guiding part to fasten to the fastening part. Then, the guiding part is further allowed to slide to the protrudent block, and then the protrudent block moves the fastening part to separate from the guiding part. When the first body slides relatively to the second body, the first elastic element deforms to get an elastic potential energy. When the protrudent block moves the fastening part to separate from the guiding part, the elastic potential energy of the first elastic element releases to allow the first body to rotate relatively to the second body along the pivot. Thus, an angel is formed between the first body and the second body.

From the above, the portable electronic device of the invention has the guiding assembly, the first elastic element and the connecting part to allow the first body and the second body to interact with each other. Via the guiding part fastens with the fastening part, and the sliding portion is slidingly disposed at the track portion and the first elastic element. When the guiding part separates from the fastening part, the first body not only can slide relatively to the second body by the sliding rod, but also can rotate relatively to the second body along the pivot. Compared with the conventional technology, the first body in the invention can not only operate relatively to the second body in a sliding mode, but also can be opened relatively to the second body to form an angle via the pivot. Thus, the first body and the second body may be located at different planes, and then the portable electronic device accords with the ergonomics. A portable electronic device which is operated conveniently, does not occupy larger room and accords with the ergonomics is provided for users.

These and other features, aspects, and advantages of the present invention will become better understood with regard to the following description, appended claims, and accompanying drawings.

BRIEF DESCRIPTION OF THE DRAWINGS

The invention will become more fully understood from the detailed description and accompanying drawings, which are given for illustration only, and thus are not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 2:
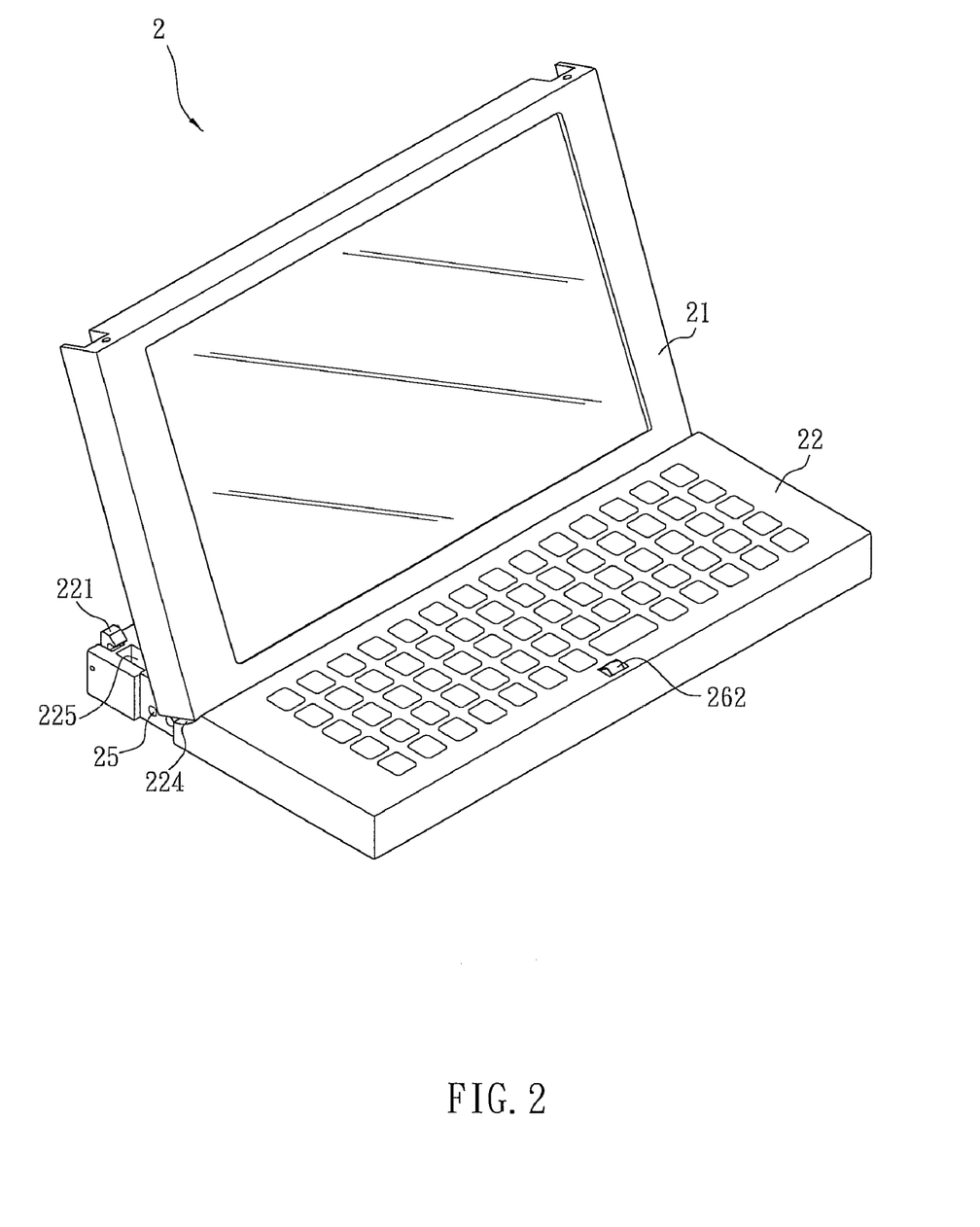
FIG. 2 is a structural schematic diagram showing a portable electronic device according to a preferred embodiment of the invention.
Figure 3:
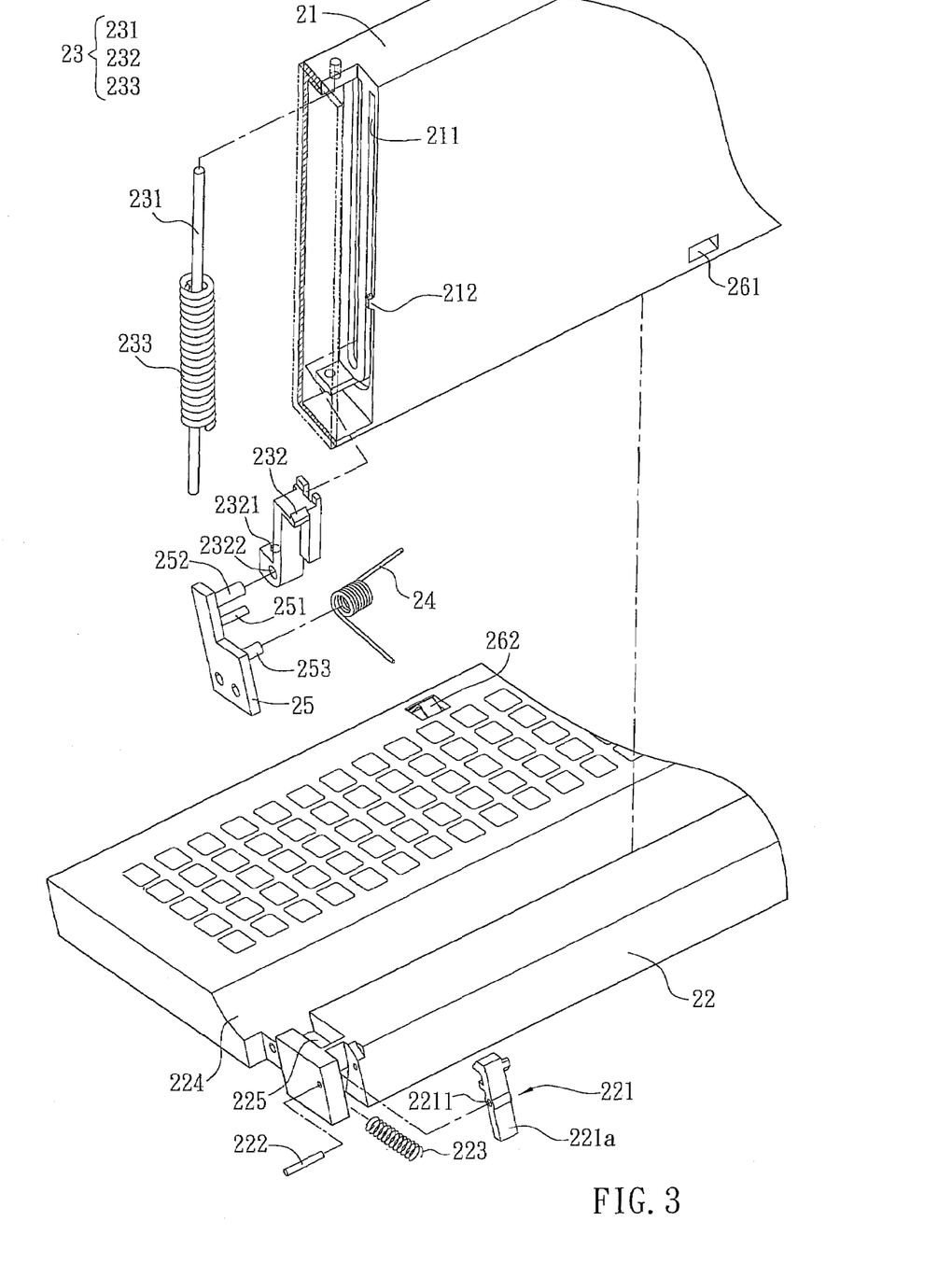
FIG. 3 is an exploded schematic diagram showing a part of the portable electronic device in FIG. 2.

FIG. 2 is a structural schematic diagram showing a portable electronic device 2 of a preferred embodiment of the invention; FIG. 3 is an exploded schematic diagram showing a part of the portable electronic device 2.

As shown in FIG. 2 and FIG. 3, in the embodiment, the portable electronic device 2 includes a first body 21, a second body 22, a guiding assembly 23, a first elastic element 24, a connecting part 25 and a clipping assembly 26. The first body 21 and the second body 22 are adjacently provided.

As shown in FIG. 3, the first body 21 has a track portion 211 and a protrudent block 212. The track portion 211 and the protrudent block 212 may be located at the shorter side or the longer side of the first body 21. The disposing position also may be adjusted according to the actual condition. In the embodiment, the track portion 211 and the protrudent block 212 are disposed at the shorter side. The track portion 211 may be a guiding groove (as shown in FIG. 3) or a guiding block (not shown).

As shown in FIG. 3, the second body 22 has a fastening part 221, a plug 222 and a third elastic element 223. The plug 222 passes through a hole 2211 of the fastening part 221 to pivotally provide the fastening part 221 at the second body 22. The two ends of the third elastic element 223 are against a first end 221a of the fastening part 221 and the second body 22, respectively, to allow the fastening part 221 to rotate with the plug 222 as the axis. Herein, the third elastic element 223 may be an extension spring, a compression spring, an elastic sheet or a telescopic sleeve.

In the embodiment, the second body 22 further has a recessed portion 224. When the first body 21 rotates relatively to the second body 22, the recessed portion 224 can provide a route to allow the first body 21 to rotate relatively to the second body 22 more smoothly.

As shown in FIG. 3, the guiding assembly 23 in the embodiment has a sliding rod 231, a guiding part 232 and a second elastic element 233. In the embodiment, the two ends of the sliding rod 231 are fixed at the first body 21, respectively, and the sliding rod 231 passes through a first through hole 2321 of the guiding part 232 to allow the guiding part 232 to slide along the sliding rod 231.

The guiding part 232 may fasten with the fastening part 221 to limit the relative positions of the first body 21 and the second body 22. That is, when the guiding part 232 fastens with the fastening part 221, the first body 21 cannot rotate relatively to the second body 22.

The second elastic element 233 is jacketed on the sliding rod 231, and the two ends of the second elastic element 233 are against the first body 21 and the guiding part 232, respectively. The second elastic element 233 may be a compression spring. The second elastic element 233 also may be an extension spring, an elastic sheet or a telescopic sleeve. The second elastic element 233 provides an elastic potential energy to allow the first body 21 to slide relatively to the second body 22.

Two ends of the first elastic element 24 are against the first body 21 and the second body 22, respectively, and the first elastic element 24 is held in a recess 225 of the second body 22 adjacent to the fastening part 221. The first elastic element 24 may be a torsion spring, or a torsion elastic sheet. When the guiding part 232 doesn't fasten with the fastening part 221, the first elastic element 24 provides a force to allow the first body 21 to rotate relatively to the second body 22. In addition, as shown in FIG. 3, the connecting part 25 of the embodiment is fixed at the second body 22, and it has a sliding portion 251 and a pivot 252.

In the embodiment, the connecting part 25 is fixed at the position adjacent to the recessed portion 224. The sliding portion 251 and the track portion 211 are slidingly connected to each other. That is, the sliding portion 251 is slidingly disposed at the track portion 211 to allow the first body 21 to slide relatively to the second body 22. When the first body 21 slides relatively to the second body 22, the sliding portion 251 can reinforce the limitation and guide the sliding direction of the first body 21 relative to the second body 22.

The pivot 252 passes through a second through hole 2322 of the guiding part 232 to allow the guiding part 232 and the connecting part 25 to pivotally connected to each other. Thus, the first body 21 may rotate relatively to the second body 22.

For example, when the guiding part 232 slides along the sliding rod 231, the guiding part 232 is connected to the connecting part 25 via the pivot 252 to allow the first body 21 to slide relatively to the second body 22. When the guiding part 232 slides to the fastening part 221, it makes the guiding part 232 fasten with the fastening part 221. Or it makes the guiding part 232 further slides to the protrudent block 212 to allow the protrudent block 212 to move the fastening part 221 to separate from the guiding part 232. When the first body 21 slides relatively to the second body 22, the first elastic element 24 deforms to get an elastic potential energy (not shown). When the protrudent block 212 moves the fastening part 221 to separate from the guiding part 232, the elastic potential energy of the first elastic element 24 releases to allow the first body 21 to rotate relatively to the second body 22 by the pivot 252. Thus, an angle is formed between the first body 21 and the second body 22 (not shown).

As shown in FIG. 3, the connecting part 25 further has a passing portion 253, and the first elastic element 24 is jacketed on the passing portion 253 to allow the first elastic element 24 to be held between the first body 21 and the second body 22 more steadily.

In addition, the clipping assembly 26 of the embodiment has a first clipping part 261 and a second clipping part 262. The first clipping part 261 and the second clipping part 262 may fasten to each other. In the embodiment, the first clipping part 261 is disposed on the first body 21, and the second clipping part 262 is disposed on the second body 22. The first clipping part 261 is an indentation, and the second clipping part 262 is a hook cooperating with the first clipping part 261. It makes the first body 21 and the second body 22 abut against each other because of the fastening of the first clipping part 261 and the second clipping part 262. The first clipping part 261 may be a hook, and the second clipping part 262 may be an indentation cooperating to the first clipping part 261.

In addition, the first body 21 may be provided with a liquid crystal display panel, a touch panel or an organic light emitting panel. The second body 22 may be provided with a keyboard or an input module.

The portable electronic device 2 of the embodiment may be a portable communication device, an UMPC, a PDA, a notebook, a MP3 player or a handheld game player.

As shown in FIG. 4A to FIG. 4E, to make the features of the embodiment more obviously, the operating process of the portable electronic device 2 of the preferred embodiment of the invention is illustrated with examples.

Figure 4A:
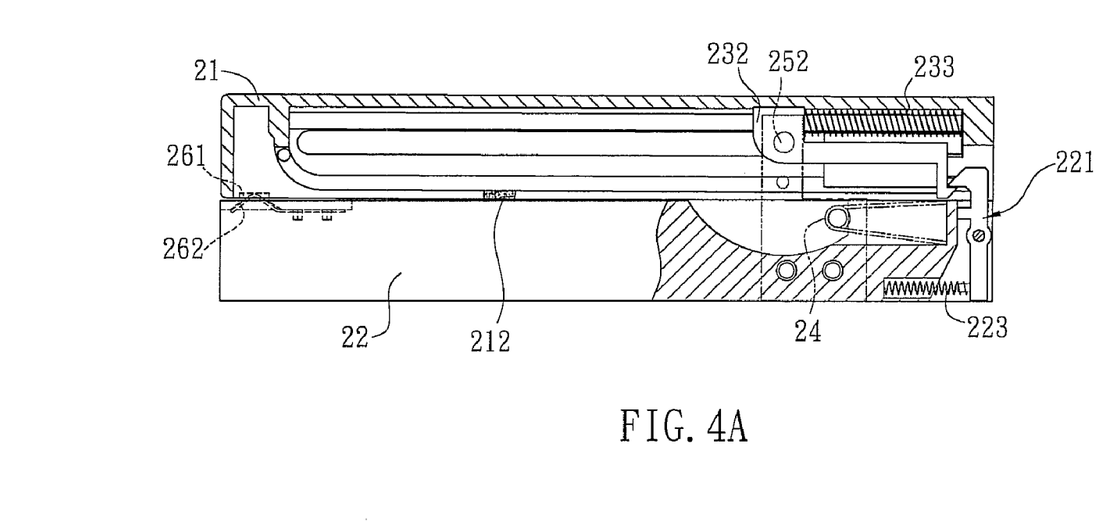
FIG. 4A to FIG. 4E are schematic diagrams showing the operation of the portable electronic device according to the preferred embodiment of the invention.

As shown in FIG. 4A, the portable electronic device 2 is in a closed state. The first clipping part 261 and the second clipping part 262 of the clipping assembly 26 are fastened to each other, and the fastening part 221 and the guiding part 232 are also fastened to each other. Thus, the first body 21 and the second body 22 abut against each other, and both the first elastic element 24 and the second elastic element 233 have the deformation because of the compression.

Figure 4B:
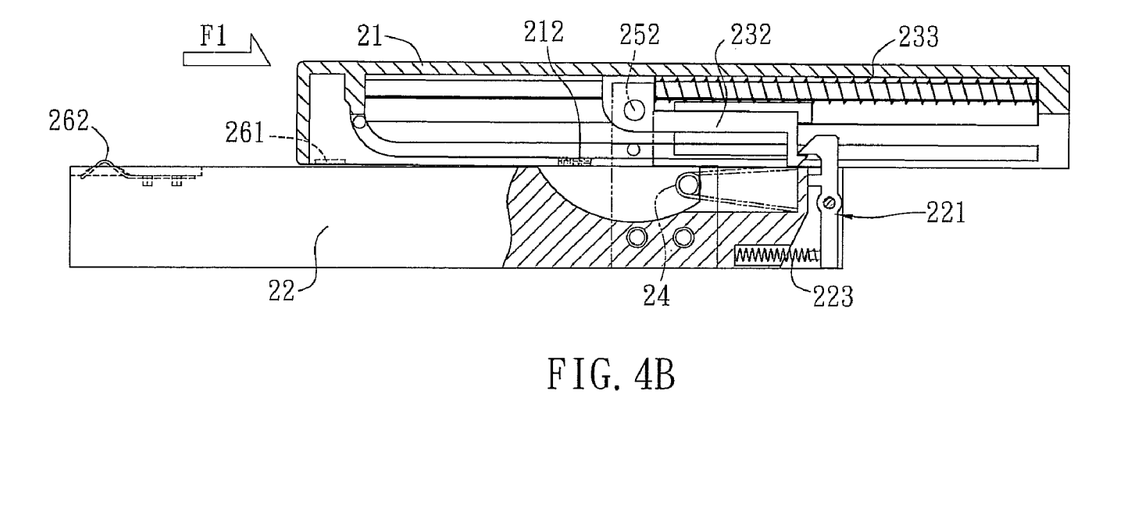
Figure 4C:
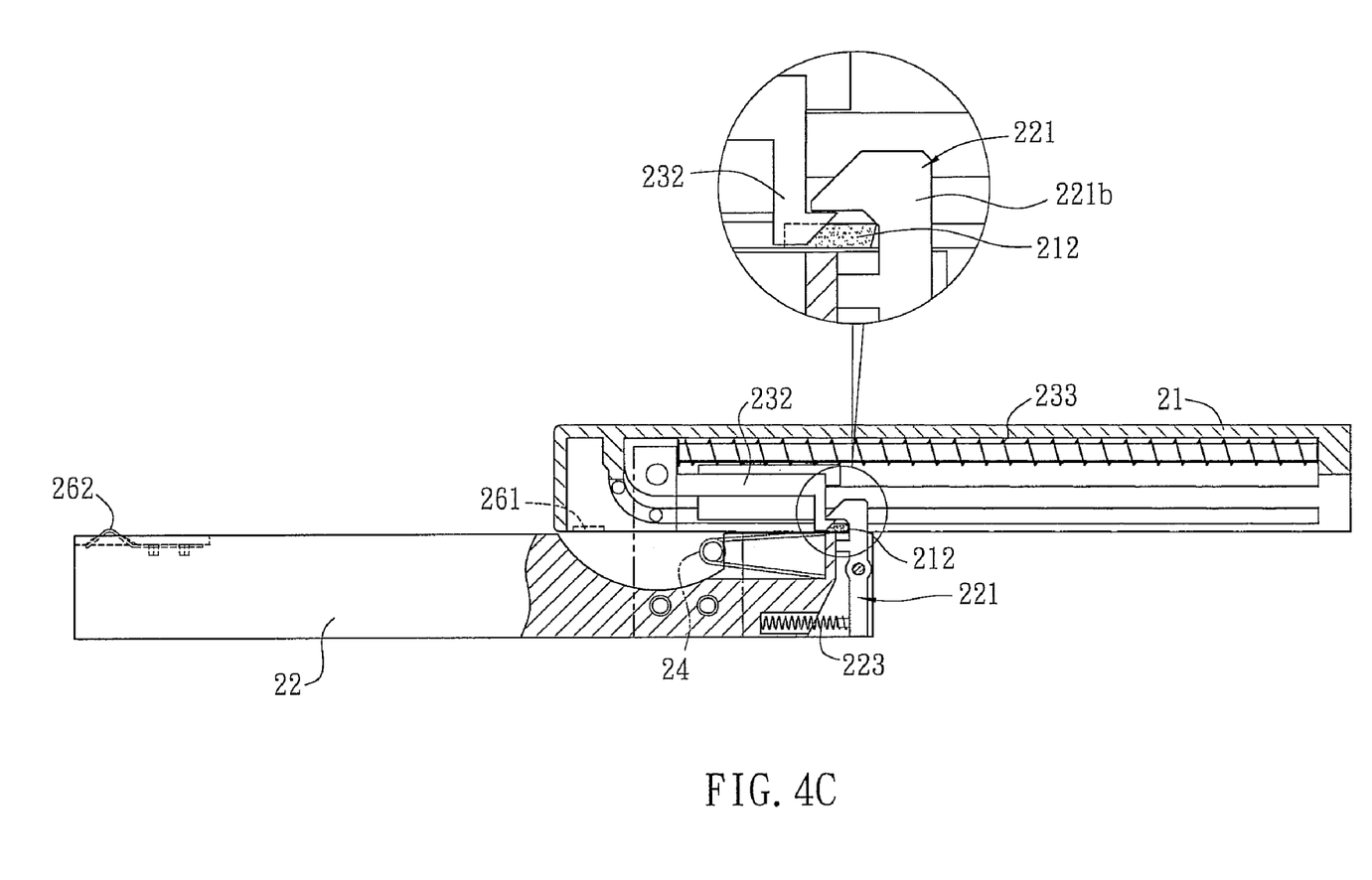

As shown in FIG. 4B and FIG. 4C, when a user applies an external force F1 to the first body 21 of the portable electronic device 2 to allow the first clipping part 261 to separate from the second clipping part 262, the elastic potential energy of the second elastic element 233 allows the first body 21 to rotate relatively to the second body 22 via the sliding rod 231 and the guiding part 232.

Figure 4D:
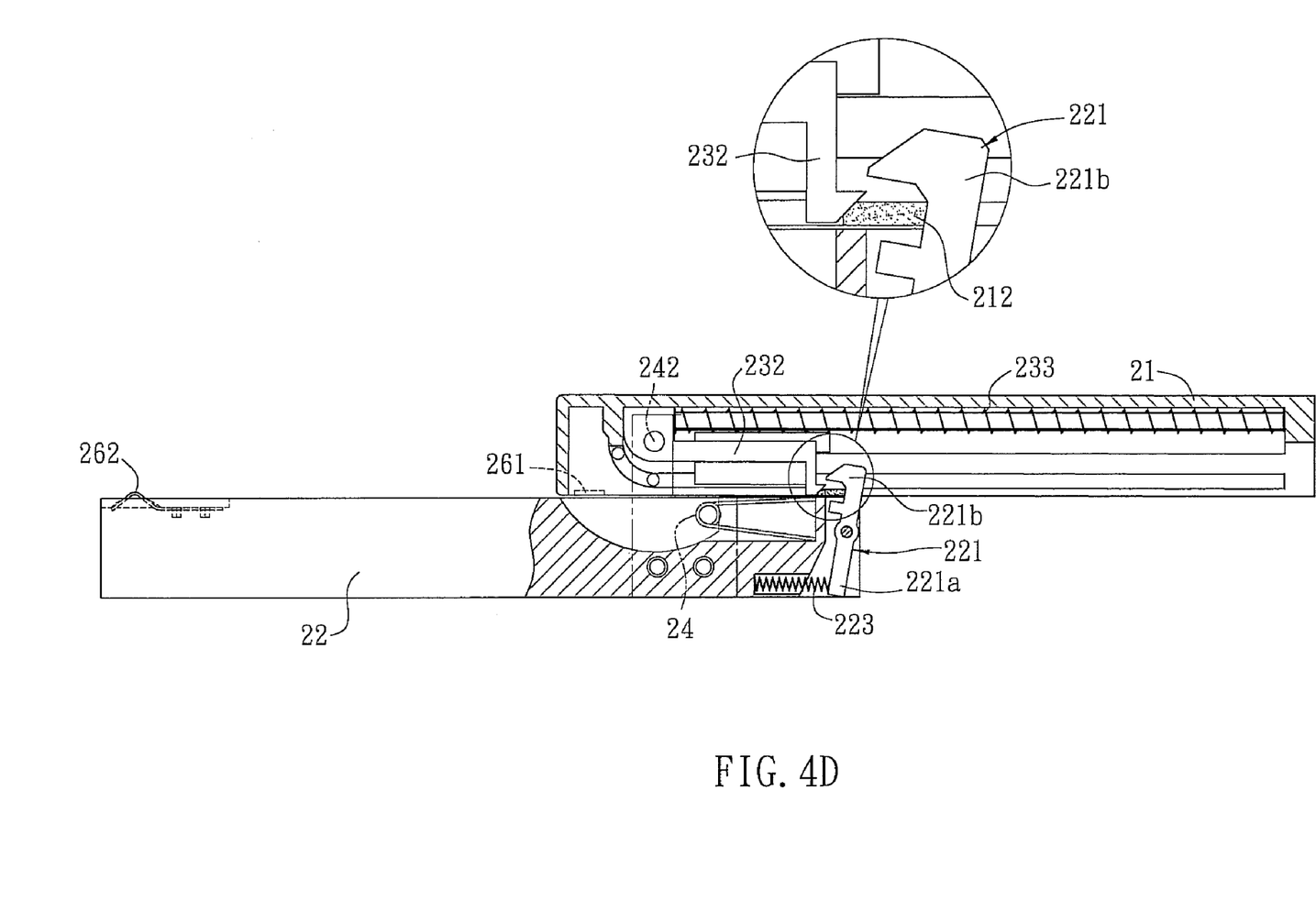

As shown in FIG. 4D, when the protrudent block 212 moves a second end 221b which is not adjacent to the third elastic element 233 in the fastening part 221, and the first end 221a of the fastening part 221 compresses the third elastic element 223, the guiding part 232 is separated from the fastening part 221. When the elastic potential energy of the second elastic element 233 is greater than the force compressing the third elastic element 223, the elastic potential energy of the second elastic element 233 releases. It makes the guiding part 232 separate from the fastening part 221 without an external force. A user also may additionally apply an external force to the first body 21 to assist the guiding part 232 in separating from the fastening part 221.

Figure 4E:
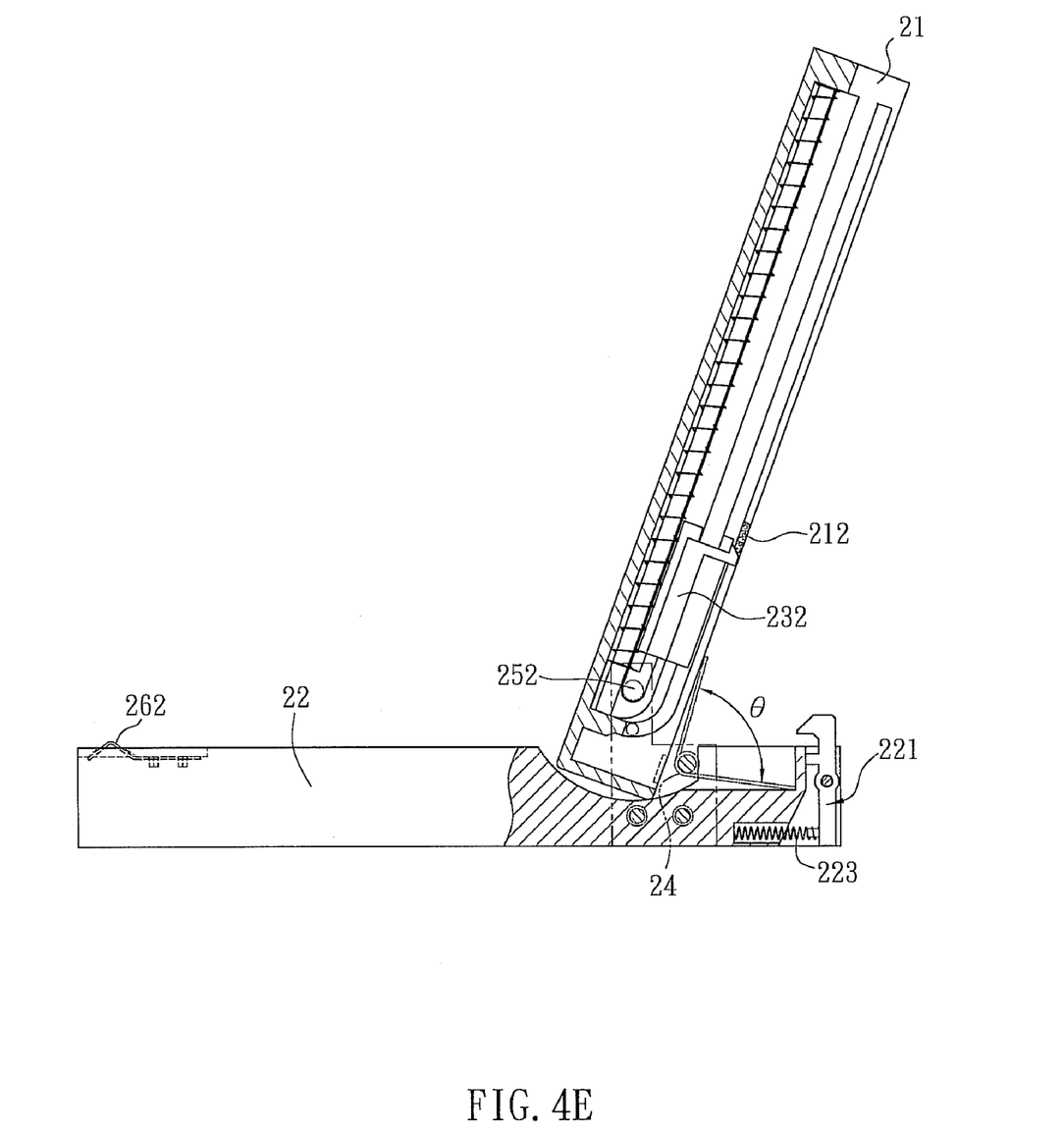

As shown in FIG. 4E, when the guiding part 232 is separated from the fastening part 221, the elastic potential energy of the compressed first elastic element 24 is released. Thus, the first body 21 rotates relatively to the second body 22 with the pivot 252 as the axis to form an angle θ between the first body 21 and the second body 22. At that moment, a user may operate the electronic device 2 by pressing the keyboard or input assembly of the second body 22.

To sum up, the portable electronic device of the invention has a guiding assembly, a first elastic element and a connecting part to allow the first body and the second body to interact with each other. Via the guiding part fastened to the fastening part, the sliding portion slidingly provided at the track portion and the first elastic element, when the guiding part separates from the fastening part, the first body can not only slide relatively to the second body via the sliding rod, but also can rotate relatively to the second body along the pivot. Compared with the conventional technology, the first body of the invention not only can be operated relatively to the second body in a sliding mode, but also may use the pivot to open relatively to the second body to form an angle. Thus, the first body and the second body are located at different planes, and then the design of the portable electronic device accords with the ergonomics. A portable electronic device which is operated conveniently, does not occupy large room and accords with ergonomics is provided for users.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A portable electronic device comprising:
  a first body having a track portion and a protrudent block;
  a second body having a fastening part;
  a guiding assembly having a sliding rod and a guiding part, wherein the two ends of the sliding rod are fixed at the first body, respectively, and the sliding rod passes through the guiding part to allow the guiding part to slide along the sliding rod;
  a first elastic element connected to the first body and the second body; and
  a connecting part fixed at the second body and having a sliding portion slidingly disposed at the track portion and a pivot passing through the guiding part, wherein the first body slides relatively to the second body to allow the guiding part to fasten with the fastening part and further to allow the guiding part to slide to the protrudent block, and then the protrudent block moves the fastening part to separate from the guiding part;
  wherein when the first body slides relatively to the second body, the first elastic element deforms to get an elastic potential energy, and when the protrudent block moves the fastening part to separate from the guiding part, the elastic potential energy of the first elastic element releases to allow the first body to rotate relatively to the second body by the pivot, and then an angle is formed between the first body and the second body.

2. The portable electronic device according to claim 1, wherein the first elastic element is a torsion spring or a torsion elastic sheet.

3. The portable electronic device according to claim 1, wherein the guiding assembly further has a second elastic element jacketed on the sliding rod, and two ends of the second elastic element abut against the first body and the guiding part, respectively.

4. The portable electronic device according to claim 3, wherein the second elastic element is an extension spring, a compression spring, an elastic sheet or a telescopic sleeve.

5. The portable electronic device according to claim 3, further comprising:
  a clipping assembly having a first clipping part disposed at the first body and a second clipping part disposed at the second body.

6. The portable electronic device according to claim 5, wherein the first clipping part is a hook or an indentation, and the second clipping part is an indentation or a hook.

7. The portable electronic device according to claim 5, wherein when the second clipping part is fastened to the first clipping part, the fastening part is fastened to the guiding part, and the first body abuts against the second body to allow the second elastic element to deforms to get an elastic potential energy.

8. The portable electronic device according to claim 7, wherein when the first clipping part separates from the second clipping part, the elastic potential energy of the second elastic element releases to allow the first body to slide along the sliding rod, and when the protrudent block moves the fastening part to separate from the guiding part, the elastic potential energy of the first elastic element releases to allow the first body to rotate relatively to the second body by the pivot, and then an angle is formed between the first body and the second body.

9. The portable electronic device according to claim 1, wherein the track portion is a guiding groove, and the sliding portion is a guiding block.

10. The portable electronic device according to claim 1, wherein the track portion is a guiding block, and the sliding portion is a guiding groove.

11. The portable electronic device according to claim 1, wherein the second body further has a third elastic element, and when the fastening part separates from the guiding part, the fastening part compresses the third elastic element to allow the third elastic element to have an elastic potential energy.

12. The portable electronic device according to claim 1, wherein the guiding part has a first through hole and a second through hole, the sliding rod passes through the first through hole, and the pivot passes through the second through hole.

13. The portable electronic device according to claim 1, wherein the second body has a recessed portion.

14. The portable electronic device according to claim 1, wherein a liquid crystal display panel, a touch panel or an organic light emitting panel is disposed at the first body.

15. The portable electronic device according to claim 1, wherein a keyboard or an input assembly is disposed at the second body.

16. The portable electronic device according to claim 1, wherein the portable electronic device is a portable communication device, an ultra mobile personal computer, a personal digital assistant, a notebook, an MP3 player or a handheld game player.

* * * * *